US009947153B2

United States Patent
Bergerhoff et al.

(10) Patent No.: US 9,947,153 B2
(45) Date of Patent: Apr. 17, 2018

(54) SECURE SMARTPHONE BASED ACCESS AND START AUTHORIZATION SYSTEM FOR VEHICLES

(71) Applicant: Continental Intelligent Transportation Systems, LLC, Santa Clara, CA (US)

(72) Inventors: Nikolas Bergerhoff, North Vancouver (CA); Ritesh Ahuja, Cupertino, CA (US)

(73) Assignee: Continental Intelligent Transportation Systems, LLC, Santa Clara, CA (US)

( * ) Notice: Subject to any disclaimer, the term of this patent is extended or adjusted under 35 U.S.C. 154(b) by 0 days.

(21) Appl. No.: 15/452,314

(22) Filed: Mar. 7, 2017

(65) Prior Publication Data
US 2017/0263062 A1    Sep. 14, 2017

Related U.S. Application Data

(60) Provisional application No. 62/305,515, filed on Mar. 8, 2016.

(51) Int. Cl.
*G05B 19/00* (2006.01)
*G07C 9/00* (2006.01)
(Continued)

(52) U.S. Cl.
CPC ......... *G07C 9/00015* (2013.01); *B60R 25/04* (2013.01); *B60R 25/24* (2013.01);
(Continued)

(58) Field of Classification Search
CPC ............ G07C 9/00007; G07C 9/00015; G07C 9/00023; G07C 9/00031; G07C 9/00039
(Continued)

(56) References Cited

U.S. PATENT DOCUMENTS 6,043,753 A * 3/2000 Okayasu ............ G07C 9/00182
340/12.22
8,275,130 B2 * 9/2012 Kawamura ........... H04L 9/0844
380/44
(Continued)

FOREIGN PATENT DOCUMENTS

WO    2016/054276 A1    4/2016

OTHER PUBLICATIONS

International Search Report and Written Opinion dated Jun. 20, 2017 from corresponding International Patent Application No. PCT/US2017/021109.
(Continued)

*Primary Examiner* — Carlos E Garcia (57) ABSTRACT

A Bluetooth enabled Smartphone may be used for both access control and start authorization in a secure and safe way, and embodiments are backward-compatible with conventional vehicle access and start systems. A smart phone acts as an intermediary authorization device to a code generator which effectively resembles a car key that is installed in a vehicle. A Bluetooth transceiver and the code generator—and, optionally, for the retrofit solution, an RF/LF transceiver—are added to the vehicle. The Bluetooth transceiver communicates with the smart phone. The code generator communicates with electronic control units in the vehicle that control access, immobilization, and engine start. The communication may happen via a wired connection or, in the case of the retrofit solution, via an RF/LF transceiver that mimics an additional car key programmed to the vehicle.

14 Claims, 10 Drawing Sheets

(51) Int. Cl.
  *H04L 29/06* (2006.01)
  *H04L 9/08* (2006.01)
  *B60R 25/24* (2013.01)
  *B60R 25/04* (2013.01)
  *H04M 1/725* (2006.01)
(52) U.S. Cl.
  CPC .......... *H04L 9/0869* (2013.01); *H04L 9/0894* (2013.01); *H04L 63/0428* (2013.01); *B60R 2325/205* (2013.01); *G07C 2009/00349* (2013.01); *G07C 2009/00412* (2013.01); *H04M 1/7253* (2013.01)
(58) Field of Classification Search
  USPC ........................................ 340/5.2, 5.21–5.22
  See application file for complete search history.

(56) References Cited

U.S. PATENT DOCUMENTS

| | | |
|---|---|---|
| 8,841,987 B1 | 9/2014 | Stanfield et al. |
| 8,947,202 B2 | 2/2015 | Tucker et al. |
| 2009/0128392 A1* | 5/2009 | Hardacker ......... H04N 21/4117 341/175 |
| 2010/0048244 A1 | 2/2010 | Goren |
| 2011/0112969 A1 | 5/2011 | Zaid et al. |
| 2012/0139703 A1* | 6/2012 | Szoke .................... G06F 21/32 340/5.83 |
| 2012/0229253 A1* | 9/2012 | Kolar ................... B60R 25/257 340/5.61 |
| 2013/0259232 A1 | 10/2013 | Petel |
| 2014/0169564 A1* | 6/2014 | Gautama ............ G07C 9/00309 380/270 |
| 2014/0266594 A1 | 9/2014 | Reiser |
| 2015/0045013 A1 | 2/2015 | Simmons |
| 2015/0263860 A1 | 9/2015 | Leboeuf |
| 2016/0236653 A1* | 8/2016 | Katou ................... B60R 25/248 |

OTHER PUBLICATIONS

Search Report dated Nov. 14, 2016, from corresponding GB Patent Application No. GB1608859.3.

* cited by examiner

SECURE SMARTPHONE BASED ACCESS AND START AUTHORIZATION SYSTEM FOR VEHICLES

BACKGROUND

Embodiments of the invention relate generally to access control and start authorization systems for vehicles.

BRIEF SUMMARY

In accordance with embodiments of the invention, a Bluetooth enabled

Smartphone may be used for both access control and start authorization in a secure and safe way, and embodiments are backward-compatible with conventional vehicle access and start systems.

In accordance with embodiments of the invention, a smart phone acts as an intermediary authorization device to a code generator which effectively resembles a car key that is installed in a vehicle. A Bluetooth transceiver and the code generator—and, optionally, for the retrofit solution, an RF/LF transceiver—are added to the vehicle. The Bluetooth transceiver communicates with the smart phone. The code generator communicates with electronic control units in the vehicle that control access, immobilization, and engine start. The communication may happen via a wired connection or, in the case of the retrofit solution, via an RF/LF transceiver that mimics an additional car key programmed to the vehicle.

DETAILED DESCRIPTION

In accordance with embodiments of the invention, a Bluetooth enabled

Smartphone may be used for both access control and start authorization in a secure and safe way, and embodiments are backward-compatible with conventional vehicle access and start systems.

Objects of the invention include, but are not limited to: using a "regular" smart phone with Bluetooth capability to provide a similar user experience as with a modern car key/key fob; providing the ability to add/delete smart phones acting as a car key to the vehicle after the vehicle's original date of manufacture; providing the ability for the system to work "offline" for a long or even virtually infinite time period, i.e. while neither the smart phone nor the vehicle has connectivity to a backend/internet; making the system work with new vehicles by modifying the existing vehicle architecture; making the system work with existing vehicles, i.e. the existing vehicle architecture remains unchanged ("retrofit solution"); preventing system components installed in the vehicle from exposing a way for an attacker, who gets physical access to the vehicle, to use the system components in the vehicle as a legitimate car key or to extract data from the systems components that would allow creation of an unauthorized car key that would provide unauthorized access and/or the unauthorized ability to start the vehicle.

In accordance with embodiments of the invention, a smart phone acts as an intermediary authorization device to a code generator which effectively resembles a car key that is installed in a vehicle. A Bluetooth transceiver and the code generator—and, optionally, for the retrofit solution, an RF/LF transceiver—are added to the vehicle. The Bluetooth transceiver communicates with the smart phone. The code generator communicates with electronic control units in the vehicle that control access, immobilization, and engine start. The communication may happen via a wired connection or, in the case of the retrofit solution, via an RF/LF transceiver that mimics an additional car key programmed to the vehicle.

The communication between the code generator and the electronic control units in the vehicle is encrypted in a conventional manner as is typically done between a legitimate electronic key device and such electronic control units.

Unlike in a regular car key, the secret key(s) SK used for encryption by the code generator are not stored in the code generator's memory. Contrarily, an encrypted version of the SK and a corresponding key AUTH to encrypt and decrypt SK are stored: one of the two is stored in the code generator and the other is stored in the smart phone. In this document, any key with a name including "PRIV" or "PUB" refers to an encryption key used in asymmetric encryption, such as 2,048-bit RSA or 256-bit ECC encryption. On the other hand, encryption keys that do not have "PRIV" or "PUB" in their names are used in symmetric encryption, such as 256-bit AES.

Smart phones to be used as car keys are enabled once via a backend service which distributes either AUTH or the encrypted SK in a secure manner using a public/private key infrastructure.

For start authorization and disabling of the immobilizer and anti theft devices on the vehicle (e.g., steering column lock, transmission shift lock) the code generator maintains contact with the smart phone via a periodic polling scheme. Received Signal Strength Indicator (RSSI) criteria may be added to limit the range of the Bluetooth connection. If the contact is interrupted, the code generator erases the decrypted version of SK from its memory rendering the device in the vehicle useless for an attacker.

Figure 1:
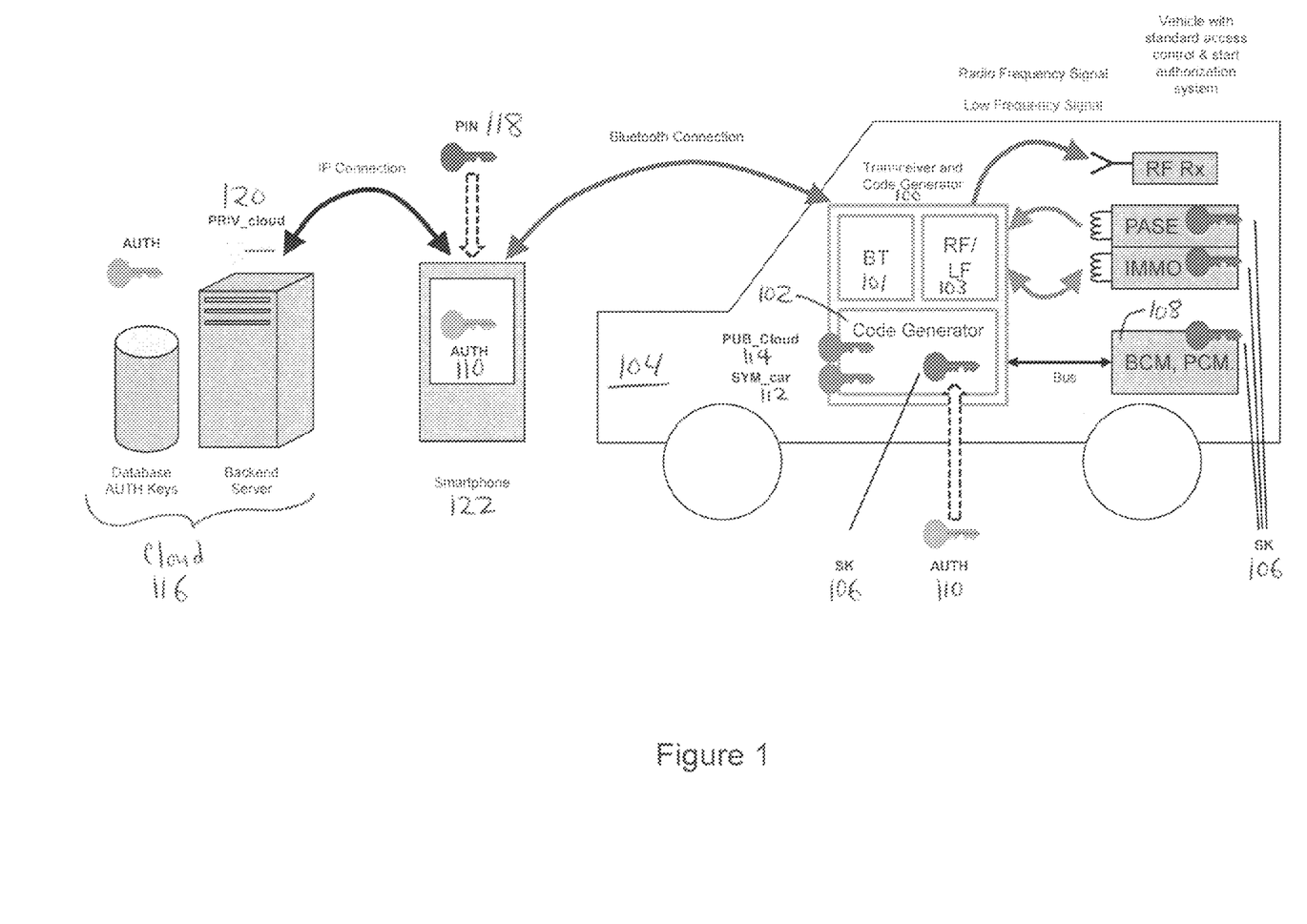
FIGS. 1-3 depict a first example implementation of a secure smartphone based access and start authorization system for vehicles in accordance with embodiments of the invention.
Figure 2:
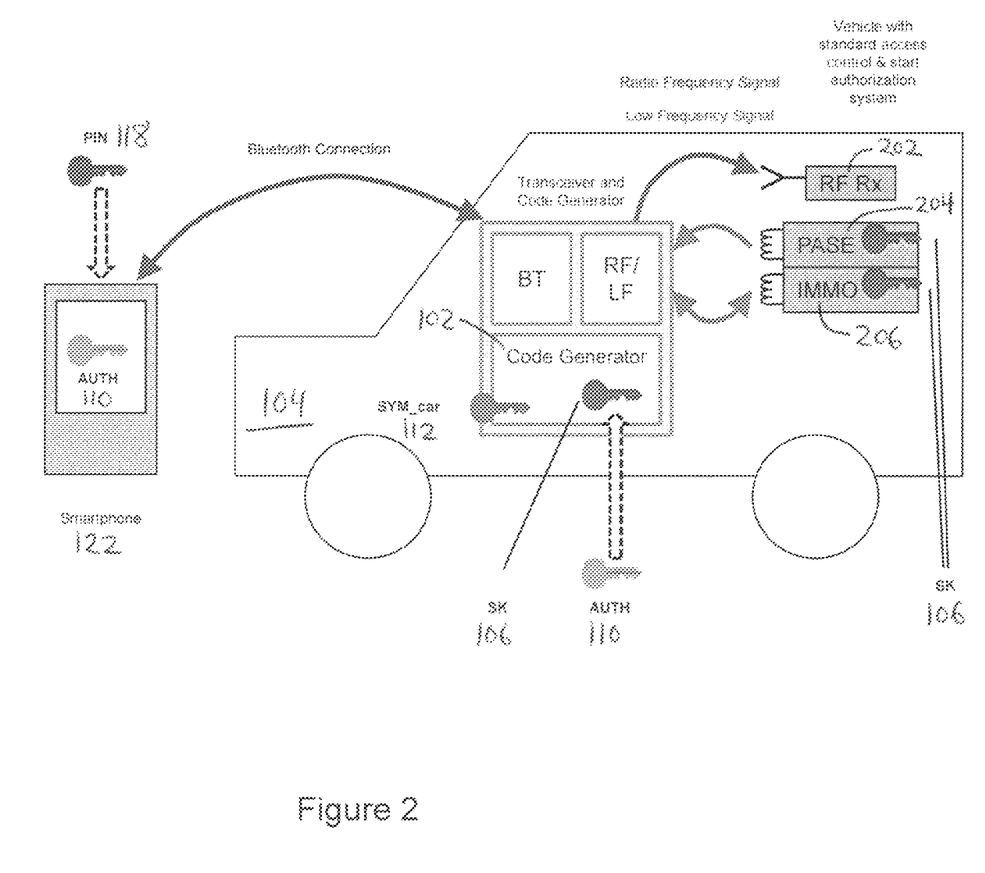
Figure 3:
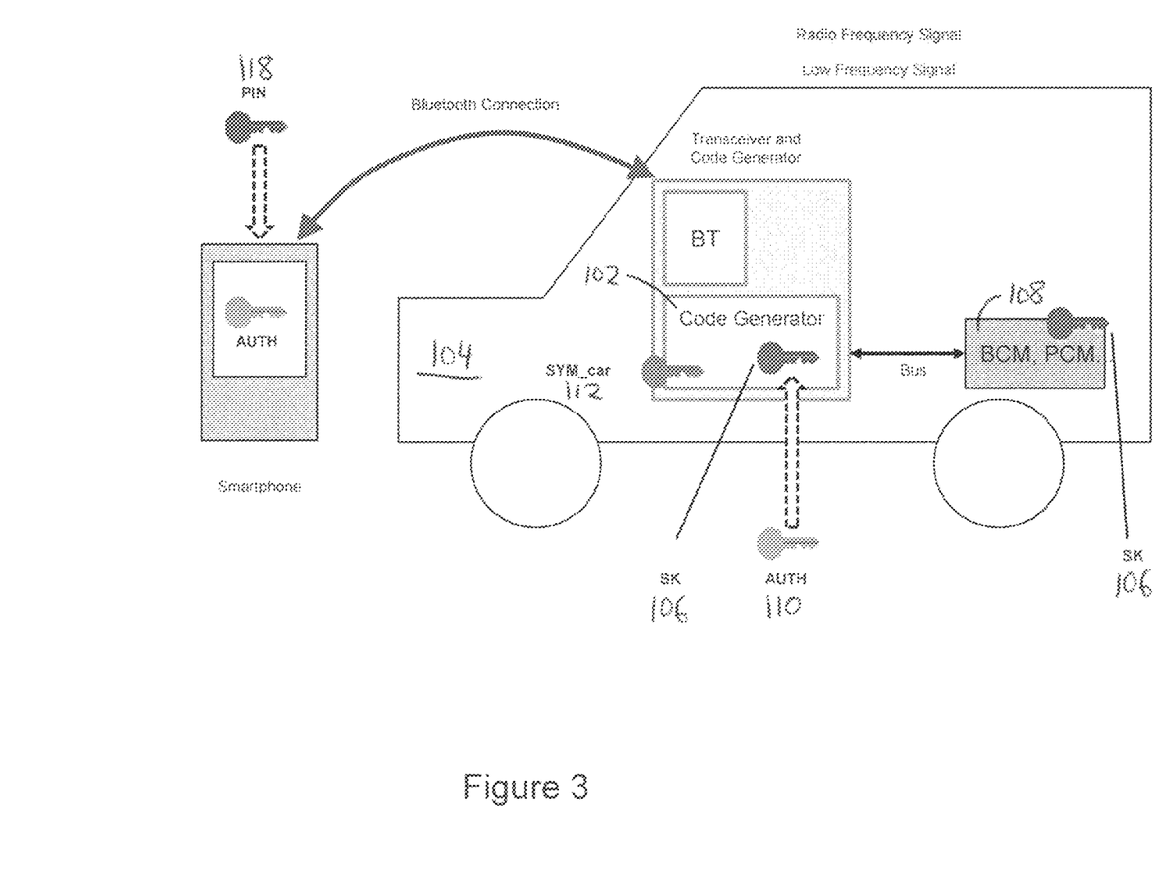

A first example implementation will now be discussed with reference to FIGS. 1-3. In particular, learning will now be discussed with reference to FIG. 1. A transceiver-and-code-generator 100 includes a Bluetooth transceiver 101 and an RF/LF (Radio Frequency/Low Frequency) transmitter/transceiver 103. The code generator 102 is learned to the vehicle 104: the SK 106 is exchanged between one or more corresponding vehicle ECUs 108 and the code generator. The code generator creates a random number AUTH 110. The code generator encrypts the SK with AUTH and stores the encrypted SK in local memory. The code Generator transfers AUTH to the cloud: AUTH is first encrypted with SYM_car 112 and then with PUB_cloud 114. Then the encrypted AUTH is sent to the cloud 116. Encryption with SYM_car ensures that it can only be decrypted by the vehicle. Encryption with PUB_cloud ensures that it can only be properly received by the cloud. The encrypted AUTH may be additionally encrypted with a (hashed) user PIN 118.

The cloud decrypts AUTH with PRIV_cloud 120. The cloud stores AUTH (still encrypted with SYM_car and optionally user PIN) and associates with VIN.

The code generator deletes AUTH from memory.

To summarize, the SK is not stored in the code generator. Instead, only an encrypted version of the SK is stored in the code generator. The code generator cannot, therefore, be misused in case an attacker gets physical access to the device. This includes battery-less limp-home mode (in the retrofit version), which cannot be exploited because the SK is not stored in clear text form. AUTH is not stored permanently in the code generator, only temporary in RAM, for encryption during learning and decryption during operation, as is discussed in more detail below.

Enabling will now be discussed with reference to FIG. 1. The phone 122 registers at the cloud and submits the vehicle's Vehicle Idenitification Number (VIN). The AUTH (still encrypted with SYM_car, and optionally the user PIN) is transferred to the phone. The phone stores the AUTH.

Operation will now be discussed with reference to FIGS. 2 and 3. FIG. 2 depicts a retrofit system in accordance with embodiments of the invention.

Access (example: active UNLOCK) will now be discussed. The user switches on the phone/app and enters PIN, fingerprint, or the like. The phone connects with the code generator (Bluetooth, pairing not required). The code generator may check the phone identity, in the manner discussed below in connection with the third implementation example. The user pushes an UNLOCK button in the app. The phone decrypts the AUTH with the user PIN if the AUTH was encrypted with the user PIN. The phone transmits the UNLOCK command together with the AUTH to the code generator. The code generator decrypts the AUTH with the SYM_car. The code generator decrypts the SK with the AUTH (and keeps the decrypted SK in RAM). The code generator generates an UNLOCK telegram encrypted with the SK and transmits the UNLOCK telegram to the RF receiver 202. The code generator then deletes the decrypted SK and AUTH from RAM memory.

Start (example: passive START after active UNLOCK was used) will now be discussed. Steps like above in connection with Access, but with the following modifications: the code generator decrypts the SK with the AUTH. Now Code Generator is ready for regular challenge-response communication for start. Note that, in analogy with NHTSA FMVSS 114 interpretations for PASE systems (regulatory) and Thatcham (insurability), the physical key could now be considered inside the passenger compartment, since the code generator has taken on this role. The phone "keeps in touch" with the code generator and resends the AUTH periodically every t_1 (e.g., 3 seconds). RSSI criteria may be added to limit the range of the Bluetooth connection. In this way, the code generator may leave the SK decrypted in memory while the phone is keeping in touch. If the code generator does not receive the AUTH or a "heartbeat" in time, T_max (T_max is greater than t_1), then the code generator encrypts the SK with the AUTH, stores the encrypted SK in memory, and deletes the AUTH from RAM. The user pushes start button. Passive Start and Entry (PASE) 204/Immobilizer (IMMO) 206 ECU sends challenge via LF. The code generator calculates a response using the SK. The code generator sends a response to the RF receiver or the IMMO. The power mode is cycled from off to ACC or engine start (depending on implementation details). Note that, in analogy with NHTSA FMVSS 114 interpretations for PASE systems (regulatory), the key would now be considered to be in the ignition switch, i.e. the electronic code (response) is in the system.

To summarize, the phone needs to be in contact with the code generator to leave the start functionality enabled. While the phone may be outside of the vehicle in this situation, the "key" (code generator with valid SK) is inside.

Note that, if the user drives away leaving the smart phone behind (outside), or the smart phone battery is discharged, the vehicle will issue a "key lost warning". In a retrofit solution, this happens when the vehicle scans for a valid key but does not receive a proper response because the code generator no longer has a decrypted version of SK.

An original equipment system will now be discussed in connection with FIG. 3. The original equipment system operates in a way similar to the discussion above, but RF/LF is not required. Direct communication with a Body Control Module (BCM), Powertrain Control Module (PCM) or the like may take place instead.

Figure 4:
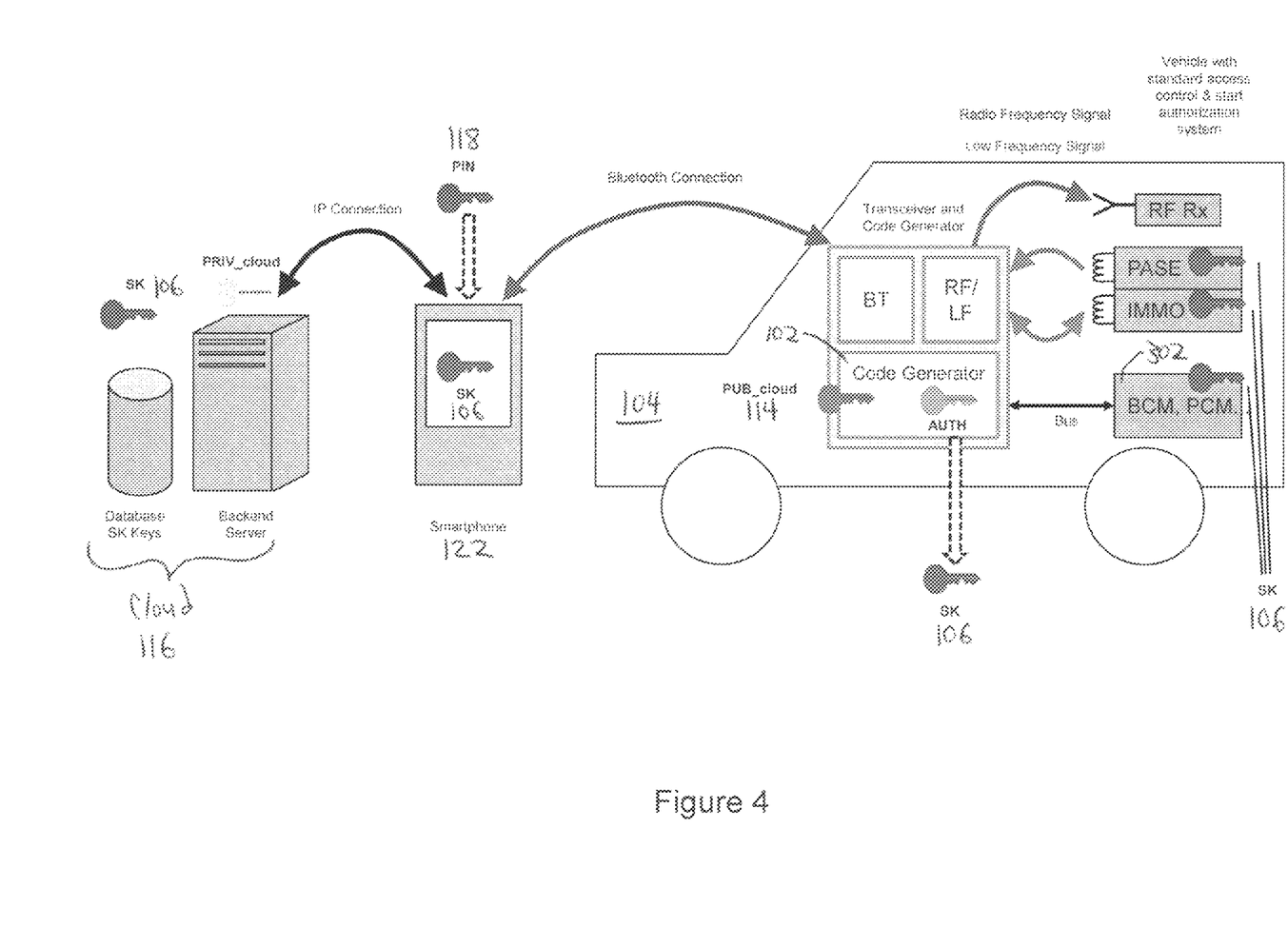
FIGS. 4-6 depict a second example implementation of a secure smartphone based access and start authorization system for vehicles in accordance with embodiments of the invention.
Figure 5:
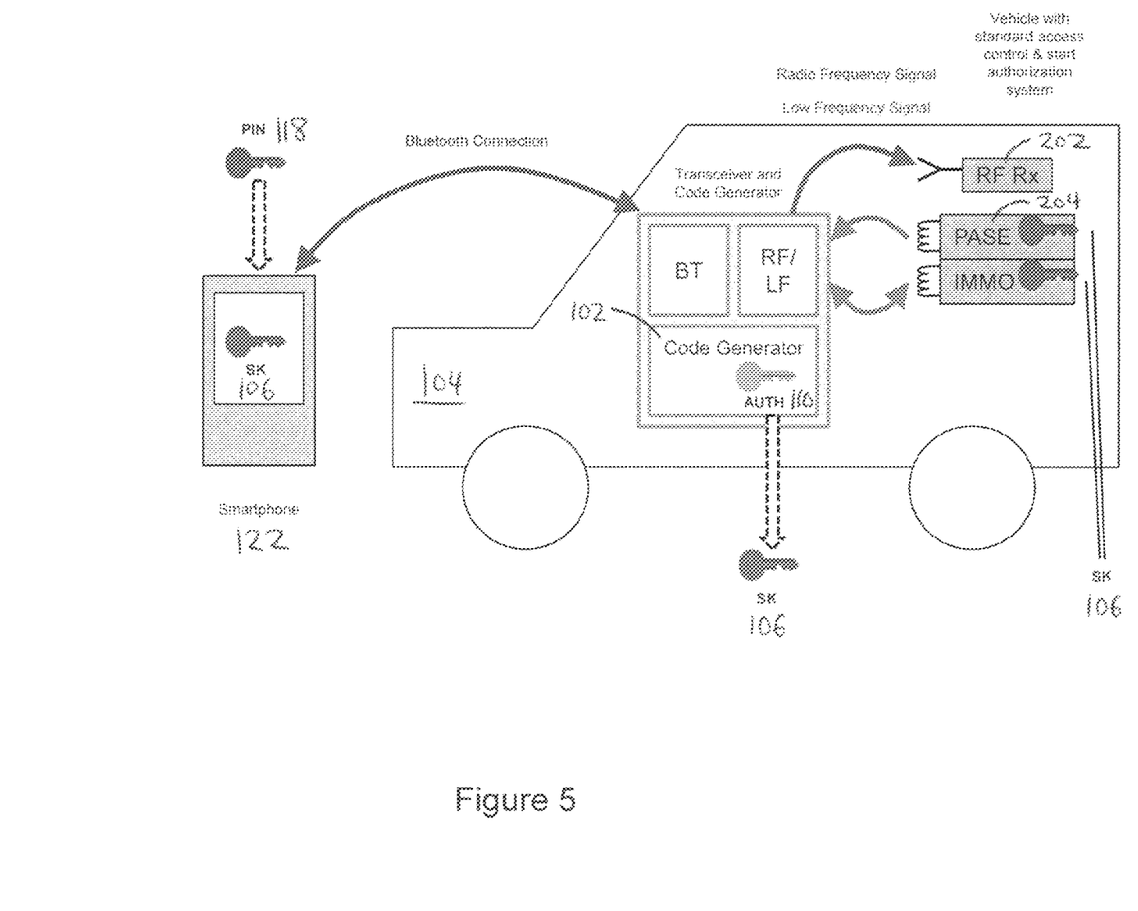
Figure 6:
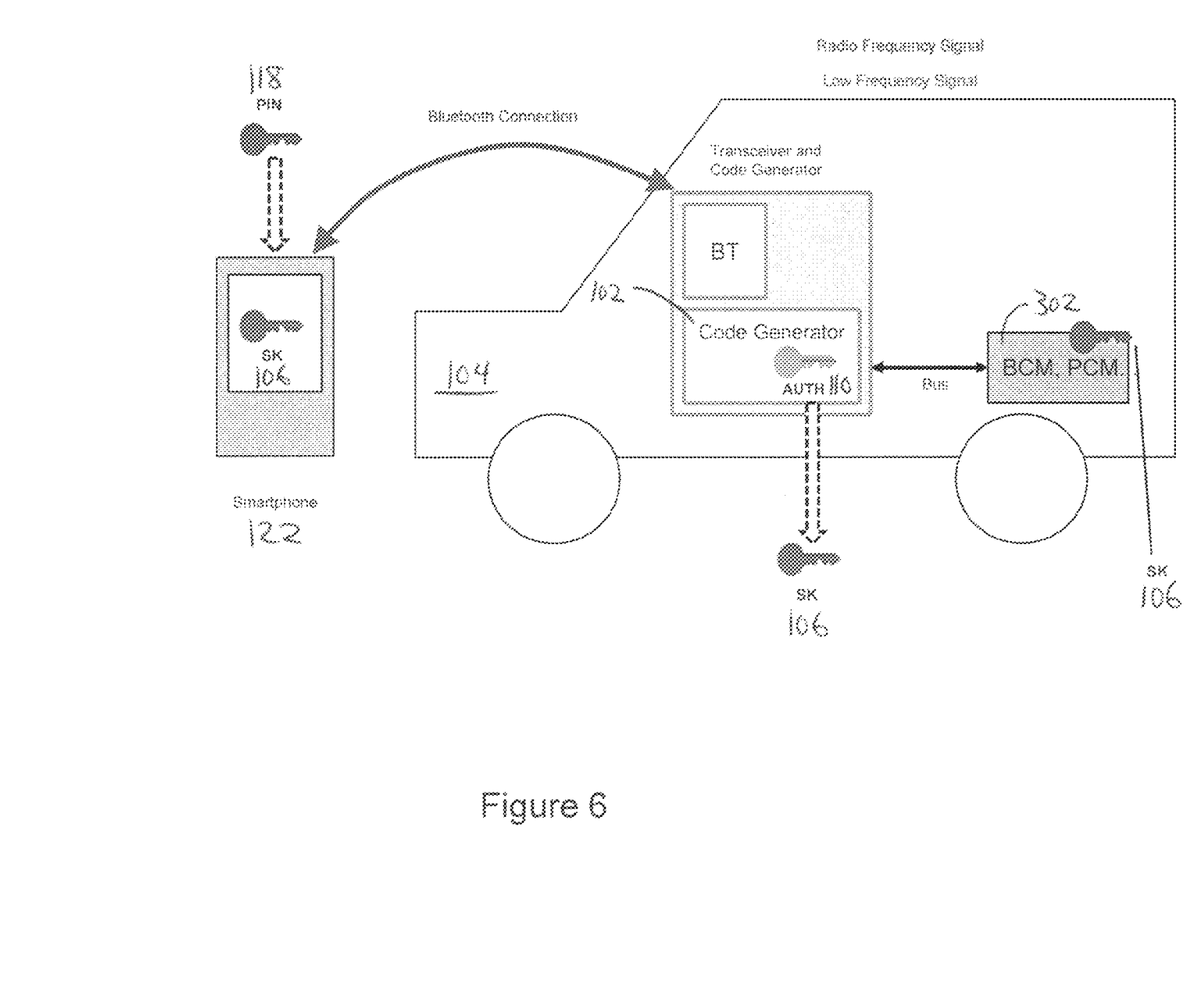

A second implementation example is discussed with reference to FIGS. 4-6. Learning will now be discussed with reference to FIG. 4. The code generator is learned to the vehicle: the SK is exchanged between a corresponding vehicle Electronic Control Unit (ECU) and the code generator. The code generator creates a random number, AUTH, and stores the AUTH in local memory. The code generator encrypts the SK with the AUTH. The code generator transfers the encrypted SK to the cloud: the SK encrypted with the AUTH is again encrypted with PUB_cloud. Then the encrypted SK is sent to the cloud. The encrypted SK may be additionally encrypted with a (hashed) user PIN. The cloud stores the encrypted SK (and associates the encrypted SK with the VIN). The code generator deletes the SK from memory.

To summarize, the code generator stores the encryption/decryption key

AUTH, but not the SK. The code generator cannot be misused in case an attacker gets physical access to the device (also battery-less limp-home mode (retrofit version) cannot be exploited since the SK is not stored). The AUTH does not leave the code generator. The SK exists only temporarily in the code generator's memory for learning and during operation, as is discussed in more detail below.

Enabling will now be discussed with reference to FIG. 4. The phone registers at the cloud and submits the VIN. The encrypted SK is transferred to the phone. The phone stores the encrypted SK.

Operation will now be discussed with reference to FIGS. 5 and 6. A retrofit system will now be discussed with reference to FIG. 5.

Access (example: active UNLOCK) will now be discussed. The user switches on the phone/app (enters PIN, fingerprint, or the like). The phone connects with the code generator (Bluetooth, pairing not required). The code generator may check the phone identity, as is discussed in more detail below in connection with the third example implementation. The user pushes an UNLOCK button in the app. The phone transmits an UNLOCK command together with the encrypted SK to the code generator. The code generator decrypts the SK with the AUTH (and keeps the decrypted SK in RAM). The code generator generates an UNLOCK telegram encrypted with the SK and transmits the UNLOCK telegram to the RF receiver. The code generator then deletes the decrypted SK from memory.

Start (example: passive START after active UNLOCK was used) will now be discussed. Steps like above, but with the following modifications: The code generator decrypts the SK with the AUTH. Now the Code Generator is ready for regular challenge-response communication for START. Note that, in analogy with NHTSA FMVSS 114 interpretations for PASE systems (regulatory) and Thatcham (insurability), the physical key could now be considered inside the passenger compartment, since the code generator has taken on this role. The phone "keeps in touch" with the code generator and resends the SK periodically every t_1 (e.g., 3 seconds). RSSI criteria may be added to limit the range of the Bluetooth connection. In this way, the code generator may leave the SK decrypted in memory while the phone is keeping in touch. If the code generator does not receive the AUTH or a "heartbeat" in time, T_max (T_max is greater than t_1), then the code generator deletes the SK from memory. The user pushes the start button. PASE/IMMO ECU sends challenge via LF. The code generator calculates a response using the SK. The code generator sends the response to the RF receiver or the IMMO. Power mode is cycled from Off to ACC or the engine starts (depending on implementation details). Note that, in analogy with NHTSA FMVSS 114 interpretations for PASE systems (regulatory), the key would now be considered to be in the ignition switch, i.e. the electronic code (response) is in the system.

To summarize, the phone needs to stay in contact with the code generator to leave the start functionality enabled. While the phone may be outside of the vehicle in this situation, the "key" (the code generator with the valid SK) is inside.

Note that, if the user drives away leaving the smart phone behind (outside), or the smart phone battery is discharged, the vehicle will issue a "key lost warning". In a retrofit solution, this happens when the vehicle scans for a valid key, but does not receive a proper response because the code generator no longer has a decrypted version of SK.

An original equipment system will now be discussed in connection with FIG. 6. The original equipment system operates in a way similar to the discussion above, but RF/LF is not required. Direct communication with a Body Control Module (BCM), Powertrain Control Module (PCM) or the like may take place instead.

Figure 7:
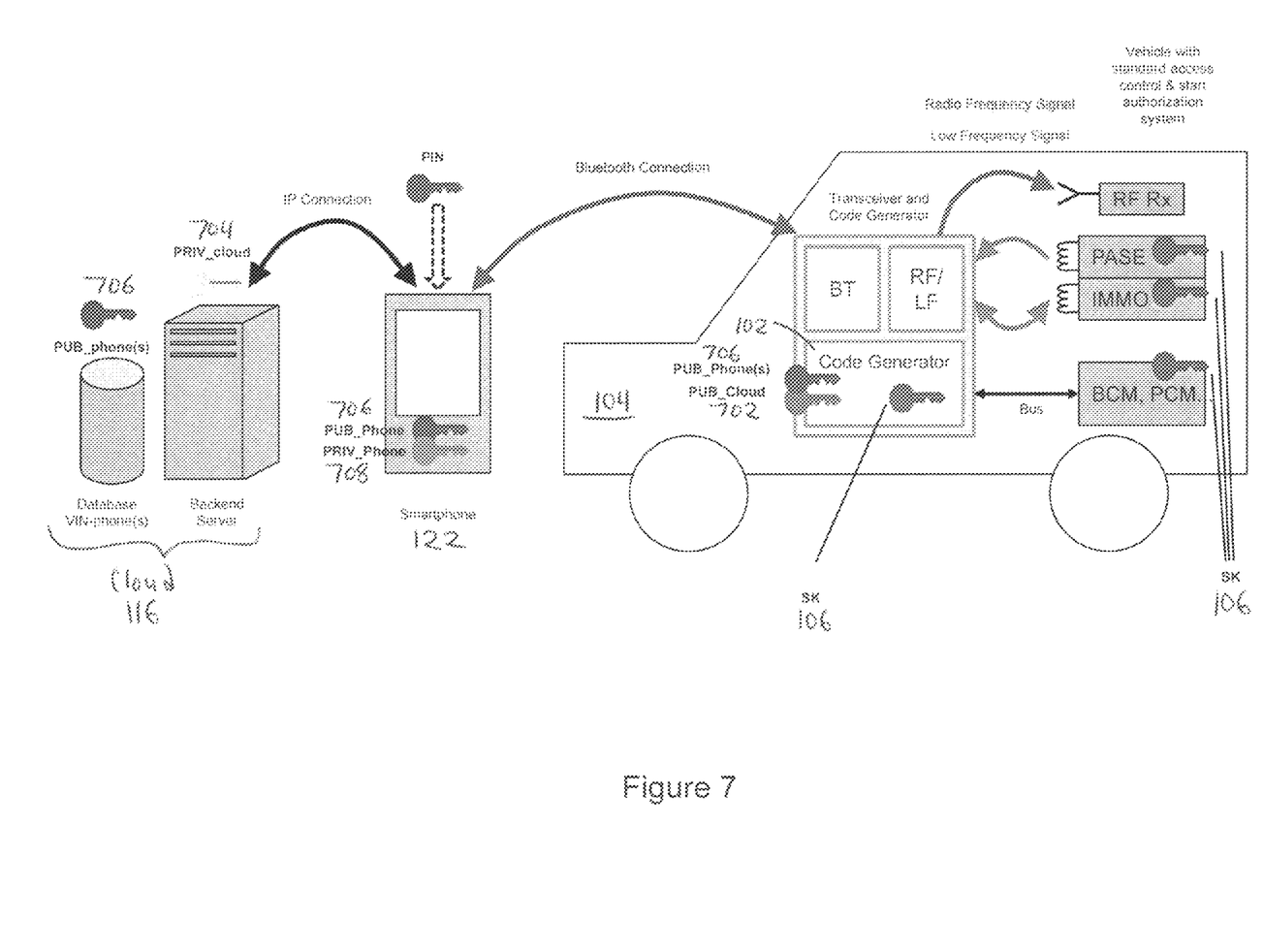
FIG. 7 depicts a third example implementation of a secure smartphone based access and start authorization system for vehicles in accordance with embodiments of the invention.

A third example implementation will now be discussed with reference to FIG. 7. This third example may be combined with either of the first two example implementations. The cloud is a trusted service manager. The code generator is factory pre-programmed with PUB_cloud 702.

Learning will now be discussed with reference to FIG. 7. The code generator encrypts a unique number with PUB_cloud and sends the encrypted unique number to the cloud. The cloud decrypts the unique number with PRIV_cloud 704 and stores the decrypted unique number in a database. The unique number can be AUTH or SK from the example implementations discussed above.

Enabling the phone will be discussed with reference to FIG. 7. The phone registers at the cloud (authentication via multiple factors), submits the VIN, and submits PUB_phone 706. The cloud signs PUB_phone with PRIV_cloud and sends it back to the phone. The phone sends the signed PUB_phone to the code generator. The code generator identifies the authenticity of PUB_phone by using PUB_cloud. The code generator stores PUB_phone in a list and will use PUB_phone in the future to check the identity of registered phones: phones will sign commands to the code generator with PRIV_phone 708.

Figure 8:
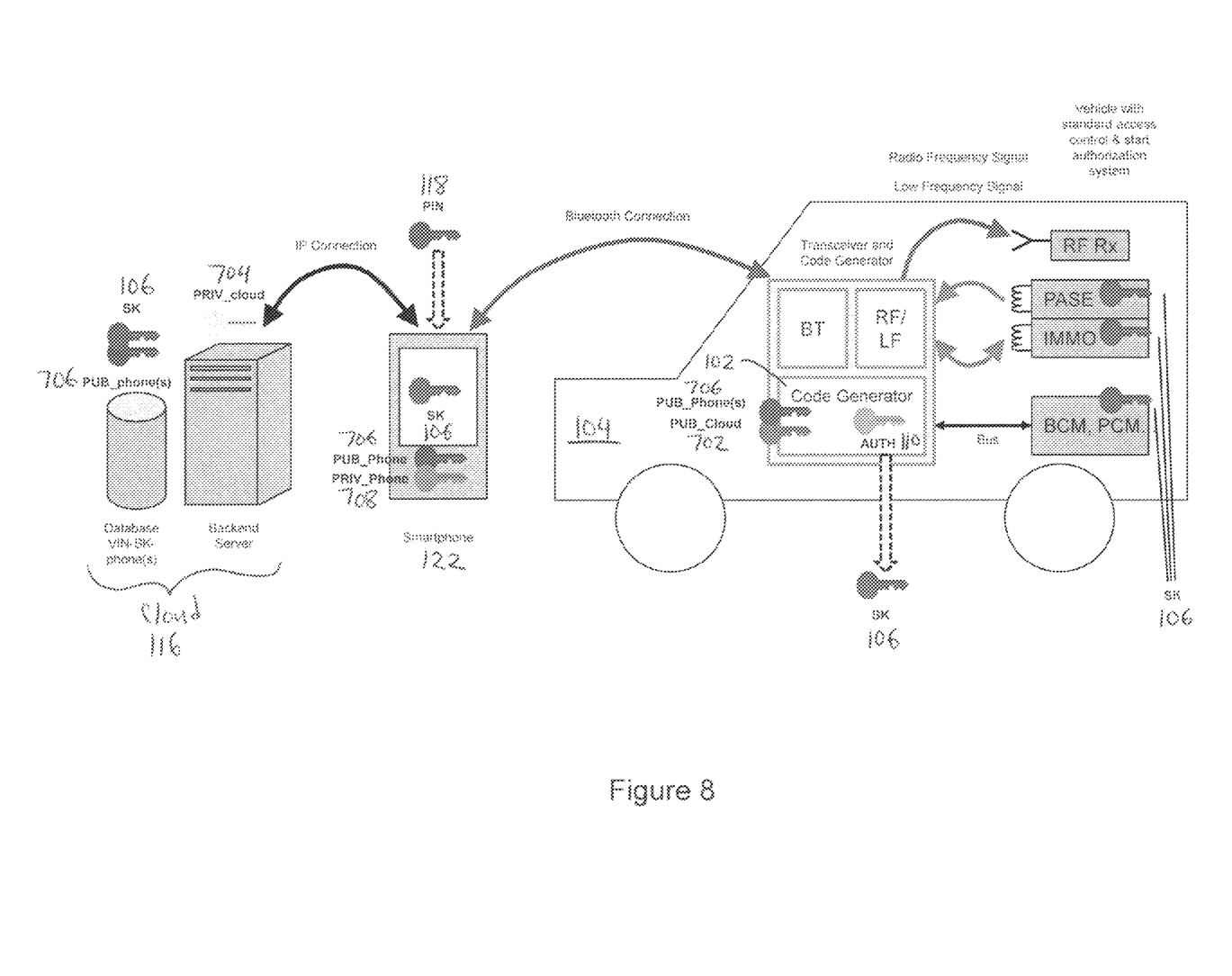
FIGS. 8-10 depict a fourth example implementation, which is a combination of the second and third example implementations, of a secure smartphone based access and start authorization system for vehicles in accordance with embodiments of the invention.
Figure 9:
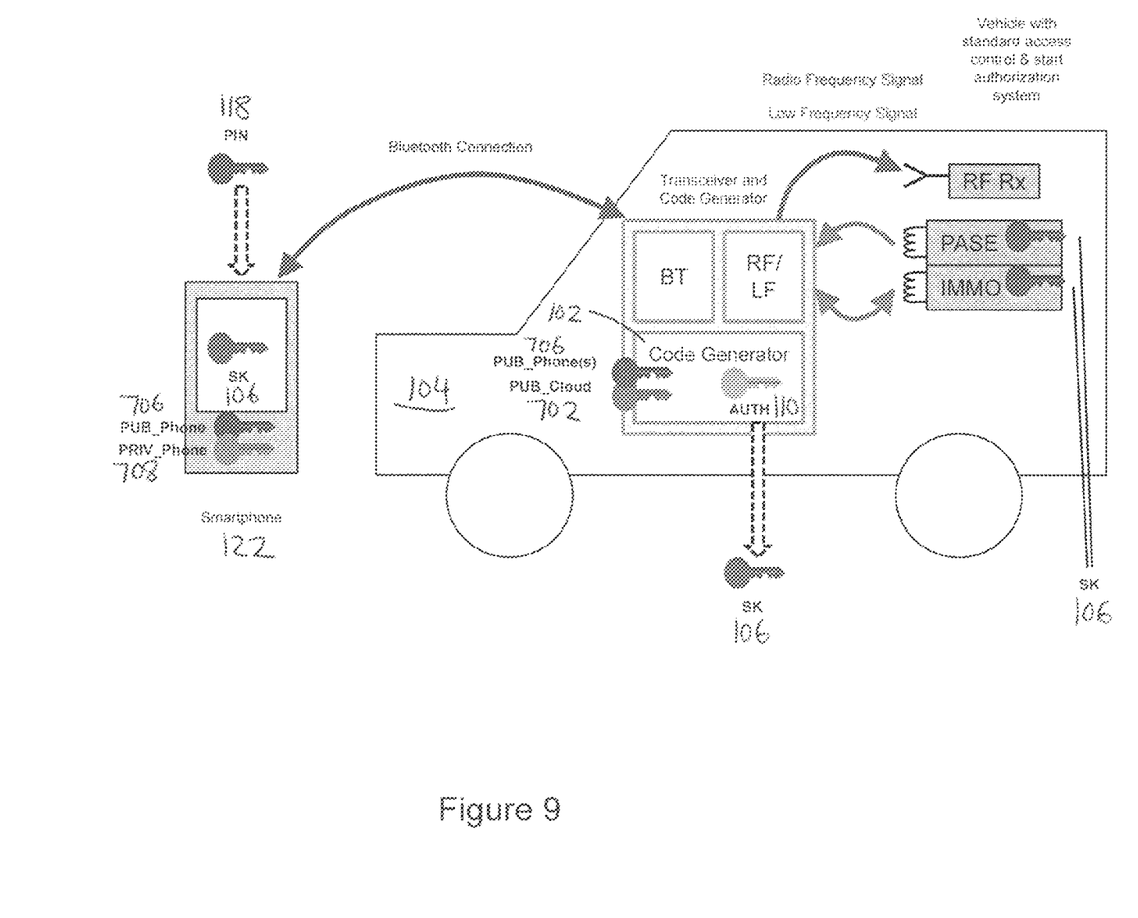
Figure 10:
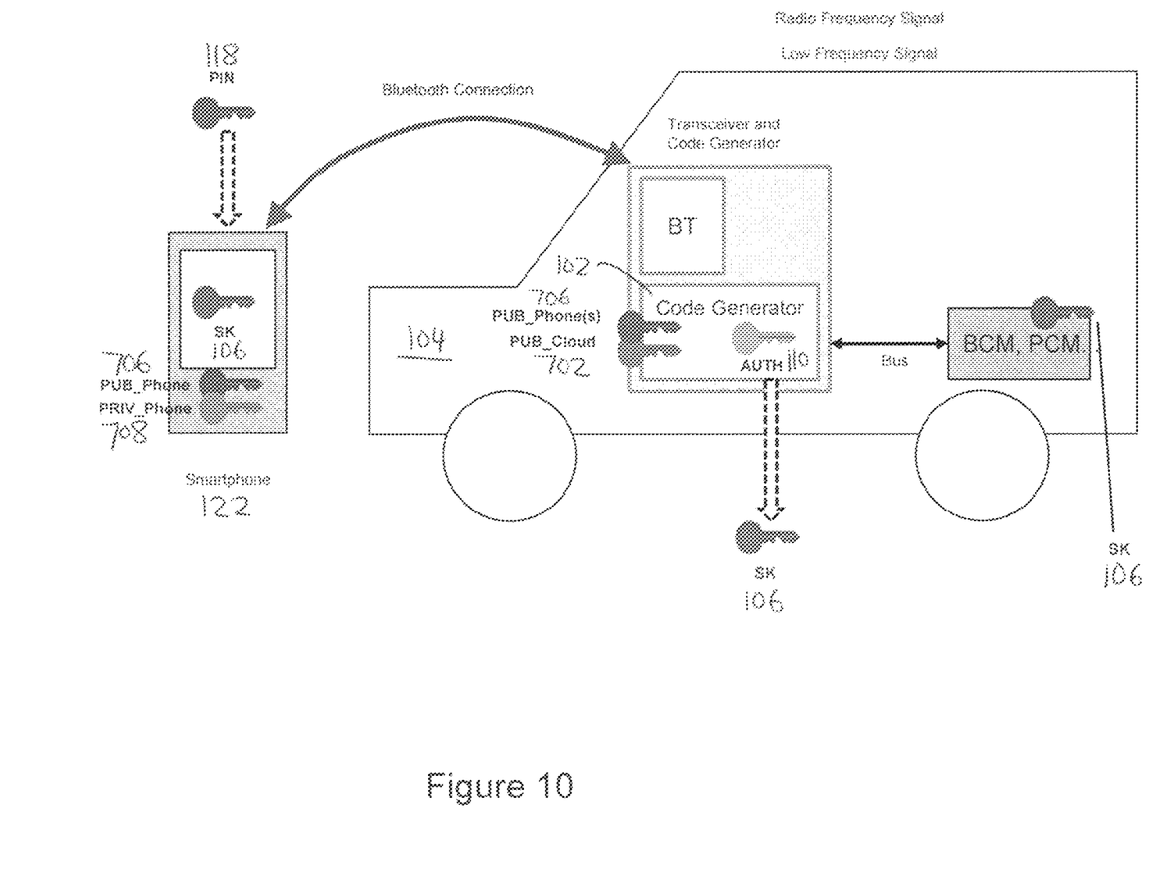

A fourth example implementation, which is a combination of the second and third example implementations, is shown FIG. 8, and the operation of the fourth example implementation is shown in FIGS. 9 and 10. As shown in FIGS. 8-10, the code generator stores AUTH, and the SK in encrypted form is stored on the smart phone and in the cloud. This results in a less complicated and more flexible solution that enables making initially non-trusted phones trustable.

To mitigate replay attacks, especially on the Bluetooth link, the messages from the smart phone to the code generator may incorporate a rolling code. Alternatively, this may also be implemented as a challenge response scheme with the response signed by the phone app.

To allow time based usage of the car, e.g. for car sharing, the key provided by the cloud to the smart phone may contain additional time information which can be evaluated by the code generator having access to a real time clock.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatuses and methods, and illustrative examples shown and described. Accordingly, departures may be made from such details without departing from the spirit or scope of applicant's general inventive concept.

The invention claimed is:

1. An apparatus comprising:
   a transceiver-and-code-generator module that is configured to be installed in a vehicle having one or more vehicle electronic control units, wherein the transceiver-and-code-generator module includes:
   a Bluetooth transceiver configured to establish a Bluetooth connection with a smartphone;
   a code generator including a code-generator memory, the code generator is configured to:
   communicate a secret key to the one or more vehicle electronic control units while learning the code generator to the vehicle,
   subsequently use the secret key to encrypt communications between the code generator and the vehicle,
   encrypt the secret key with a random number AUTH, store the encrypted secret key in the code-generator memory, and
   not store in the code-generator memory the secret key in unencrypted form thereby preventing unauthorized access, via the code generator, to the secret key by a person who has access to the vehicle.

2. The apparatus of claim 1, wherein the code generator stores either an encryption key used to encrypt and decrypt the secret key or the secret key in encrypted form.

3. The apparatus of claim 1, wherein the smartphone is enabled via a backend service that distributes, in a secure manner using public/private key infrastructure, either a unique number used for encrypting the secret key or the secret key in encrypted form.

4. The apparatus of claim 1, wherein the code generator is configured to maintain contact with the smartphone via a periodic polling scheme.

5. The apparatus of claim 4, wherein the code generator is configured to use received signal strength indicator criteria to limit the range of the Bluetooth connection.

6. The apparatus of claim 5, wherein the code generator is configured to, upon interruption of the Bluetooth connection, erase from memory any stored instances of the secret key in decrypted form to prevent unauthorized access to the secret key.

7. The apparatus of claim 1, wherein the code generator is configured to generate the random number AUTH.

8. The apparatus of claim 1, wherein the code generator is configured to encrypt the random number AUTH and send the random number AUTH in encrypted form to the backend service.

9. The apparatus of claim 8, wherein the code generator is configured to delete the random number AUTH from code-generator memory.

10. The apparatus of claim 1, wherein the code generator is configured to generate and store in local memory a random number AUTH.

11. The apparatus of claim 10, wherein the code generator is configured to encrypt the secret key with both the random number AUTH and with PUB_cloud and to send the encrypted secret key to the cloud.

12. The apparatus of claim 11, wherein the secret key is additionally encrypted with a hashed user PIN.

13. The apparatus of claim 11, wherein the cloud is configured to store the encrypted secret key and to associate the encrypted secret key with a corresponding vehicle identification number.

14. The apparatus of claim 13, wherein the code generator is configured to delete the secret key from local memory.

* * * * *